United States Patent
Meier et al.

(10) Patent No.: US 8,521,334 B2
(45) Date of Patent: Aug. 27, 2013

(54) METHOD FOR DIAGNOSING THE STATE OF WEAR OF A VALVE ARRANGEMENT FOR CONTROLLING THE FLOW OF A PROCESS MEDIUM

(75) Inventors: Urs E. Meier, Würenlingne (CH); Detlef Pape, Nussbaumen (CH)

(73) Assignee: ABB Technology AG, Zurich (CH)

( * ) Notice: Subject to any disclaimer, the term of this patent is extended or adjusted under 35 U.S.C. 154(b) by 872 days.

(21) Appl. No.: 12/638,440

(22) Filed: Dec. 15, 2009

(65) Prior Publication Data

US 2010/0152908 A1 Jun. 17, 2010

(30) Foreign Application Priority Data

Dec. 15, 2008 (DE) .......................... 10 2008 062 290

(51) Int. Cl.
*G05D 7/00* (2006.01)
(52) U.S. Cl.
USPC .............................. 700/282; 702/47; 137/554
(58) Field of Classification Search
USPC .............................. 700/282; 702/47; 137/554
See application file for complete search history.

(56) References Cited

U.S. PATENT DOCUMENTS 5,904,666 A * 5/1999 DeDecker et al. ............... 604/65

FOREIGN PATENT DOCUMENTS

| EP | 0 739 503 B1 | 6/2001 |
| EP | 1 812 718 B1 | 8/2008 |
| WO | WO 2005/109140 A1 | 11/2005 |

OTHER PUBLICATIONS

German Search Report for DE 10 2008 062 290.7.

* cited by examiner

*Primary Examiner* — Mohammad Ali
*Assistant Examiner* — Sheela S Rao
(74) *Attorney, Agent, or Firm* — Buchanan Ingersoll & Rooney PC

(57) ABSTRACT

A method and valve arrangement are provided for controlling the flow of a process medium through a pipeline. A pneumatic actuator moves a valve element, which is accommodated in a valve housing, and switches the flow of the process medium, in accordance with a positioning control system by means of a control piston, to at least one side of which control pressure is applied in a drive chamber. An electronic evaluation unit connected to the positioning control system monitors the operating state. A pressure sensor measures the pressure in the drive chamber, and the evaluation unit analyzes the measured pressure value with respect to a pressure p and the pressure change $dp(t)$ over time to determine the flow into/from the drive chamber and/or the ratio (V/A) of the drive chamber volume to the effective opening cross section of the valve arrangement as a measure of the operating state of the valve arrangement.

13 Claims, 2 Drawing Sheets

METHOD FOR DIAGNOSING THE STATE OF WEAR OF A VALVE ARRANGEMENT FOR CONTROLLING THE FLOW OF A PROCESS MEDIUM

RELATED APPLICATION

This application claims priority under 35 U.S.C. §119 to German Patent Application No. 10 2008 062 290.7 filed in Germany on Dec. 15, 2008, the entire content of which is hereby incorporated by reference in its entirety.

FIELD

The present disclosure relates to a method for diagnosing the operating state of a valve arrangement for controlling the flow of a process medium through a pipeline, as well as a method for diagnosing the operating state of the the valve element of such an arrangement. The present disclosure also relates to a valve arrangement having an electronic evaluation unit which carries out such a method.

The term "positioning control system" as used herein encompasses a mechatronic system which controls the auxiliary energy of a pneumatic actuator according to one or more input signals in order to move a valve element into a particular position. For operation, the positioning control system may be supplied with pressurized gas, usually compressed air, as auxiliary energy as well as electrical energy.

A known pneumatic position controller has at least the core components described in more detail below. A pneumatic system is used to deliberately ventilate or vent the drive chambers of a single-acting or double-acting pneumatic actuator on the basis of one or more input signals. The pneumatic system includes an auxiliary energy supply line, one or more pilot valve arrangements, and control pressure supply lines to the drive chambers for controlling the ventilation and/or venting of the drive chambers. A position sensor in the form of a position feedback sensor system is used to represent the movements and positions of the valve element in the form of one or more signals. In addition, control electronics, which have a microcontroller and receive one or more input signals, are provided. The firmware in the control electronics processes the input signals and the signals from the position sensor to form output signals which are used as input signals for the pneumatic system.

The firmware in the positioning control system implements a function which analyzes the dynamic properties of the connected pneumatic actuator. Upon start-up, the adjusting range of the valve element is run through once during an initialization process, and the initial and final values of the adjusting range are recorded.

Actuators are divided into pivoting drives and lifting drives. In the case of the lifting drive, the linear movement of the output drive of the actuator is directly transmitted to a linearly operated actuating member. On the other hand, in the case of the pivoting drive, the linear movement of the output drive of the actuator is converted into a rotational movement using suitable conversion means.

The pneumatic actuator and the positioning control system are connected using an attachment. The attachment comprises components which transmit the movement and position of the actuator with respect to the position feedback sensor system to the positioning control system.

In particular, dynamic sealing rings inside the pneumatic actuator, which can be composed of an elastomeric material, wear out over the course of the service life and require a corresponding outlay of maintenance. For instance, leakages can occur, which makes it necessary to replace the seals as a maintenance measure.

EP 0 739 503 B1 reveals a valve arrangement having such a positioning control system, which comprises diagnostic means for monitoring the operating state. The positioning control system for the valve element, which is a closing body for a valve seat in this case, operates in accordance with an electrical actuating signal which is predefined externally. Inside the positioning control system, a corresponding sensor system measures the current position of the valve element, and the control pressure to and from the drive chamber is controlled in order to move the valve element into the desired position. The control pressure is provided by an external control pressure source and is supplied to the drive chamber by an internal pilot valve arrangement depending on the actuating signal. Alternatively, the drive chamber is vented in order to move the valve element in the correct direction. In this case, the movement is applied by means of an integrated restoring spring.

On account of the component dimensions, which are usually very small, and high switching frequencies, the valve mechanism of a pilot valve arrangement is particularly sensitive to contamination which causes wear and can be transported, in particular, by means of the compressed air in the region of the sensitive pilot valve arrangement. Failure of the pilot valve arrangement results in a defect in the pneumatic system, which may cause a standstill in the operation of the entire valve arrangement. In addition to contamination, leakages should also be avoided, such as in the region of the pneumatic lines between the pneumatic valve and the connected actuator.

WO2005/109140 A1 reveals an electronic evaluation unit for monitoring the operating state of a valve arrangement. For this purpose, the pressure upstream and downstream of the valve element of a pneumatic valve is measured. Furthermore, the opening cross section of the valve element is determined by a position sensor system. Data representing the measured pressure values and the determined opening cross section are used to calculate the flow of gas through the pilot valve. Conclusions regarding the operating state of the pneumatic valve can be drawn by analyzing the flow of gas with actual operating conditions. Indications of a normal operating state or an error state can thus be obtained in order to take maintenance measures in good time.

A disadvantage of this electronic evaluation unit for diagnosing the operating state is the very high outlay on sensor technology, since different pressure sensors and additional sensors are required, as well as the detailed amount of information regarding successful operation of the pneumatic system that is required to be able to determine a malfunction in the system.

SUMMARY

An exemplary embodiment provides a method for diagnosing the operating state of a valve arrangement for controlling a flow of a process medium through a pipeline, wherein the valve arrangement includes a valve element accommodated in a valve housing and configured to switch the flow of the process medium in accordance with a positioning control system via a pneumatic actuator having a control piston, to at least one side of which control pressure is applied in a drive chamber, and an electronic evaluation unit connected to the positioning control system and configured to monitor the operating state of the valve arrangement. The exemplary method comprises measuring in a pressure sensor the pressure in at least one of the drive chamber and a pneumatic part operatively connected to the drive chamber. The exemplary method also comprises analyzing the measured pressure in the evaluation unit with respect to a pressure p and a pressure change dp(t) over time to determine at least one of the flow into/from the drive chamber and a ratio of a volume of the drive chamber volume to an effective opening cross section of the valve arrangement as a measure of the operating state of the valve arrangement.

An exemplary embodiment provides a valve arrangement for controlling a flow of process medium through a pipeline. The exemplary valve arrangement comprises: a valve housing configured to accommodate a valve element, a position control system configured to control a control piston to control movement of the valve element, and a drive chamber configured to apply a control pressure to at least one side of the control piston. The exemplary valve arrangement also comprises a pneumatic actuator configured to move the valve element accommodated in the valve housing and switch the flow of a process medium in accordance with the positioning control system, an electronic evaluation unit connected to the positioning control system and configured to monitor an operating state of the valve arrangement, and a pressure sensor configured to measure the pressure in the drive chamber. According to an exemplary embodiment, the electronic evaluation unit is configured to analyze the pressure value measured by the pressure sensor with respect to a pressure p and a pressure change dp(t) over time and to determine at least one of the flow into/from the drive chamber and a ratio of the drive chamber volume to the effective opening cross section of the valve arrangement as a measure of the operating state of the valve arrangement.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
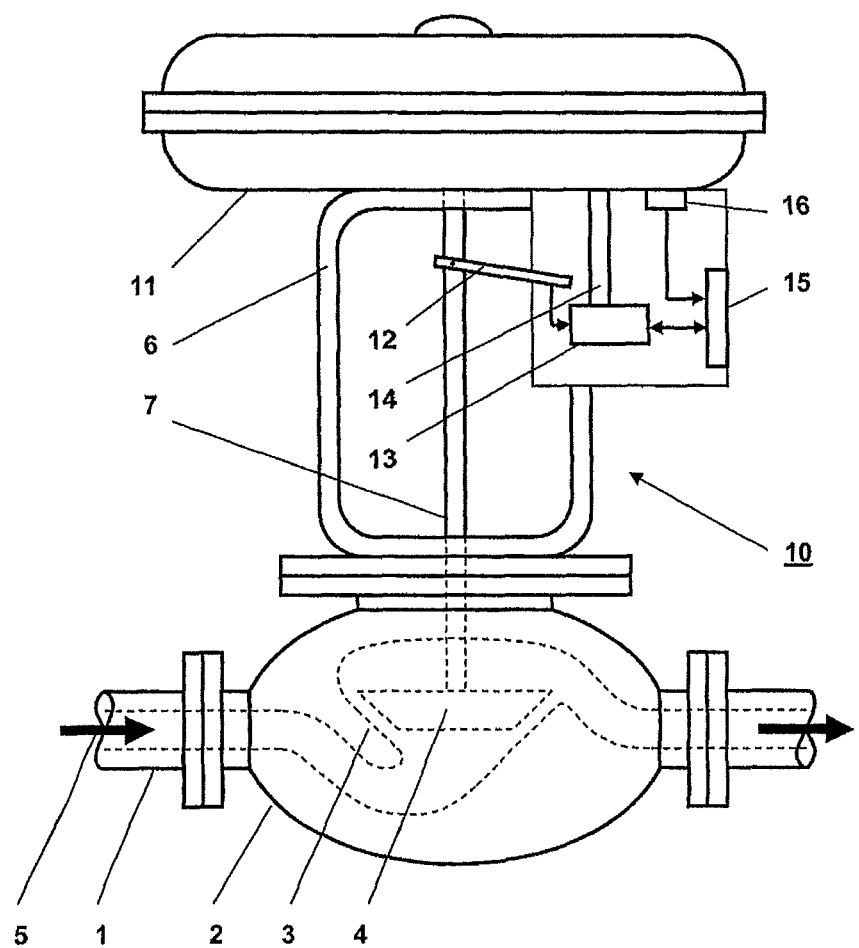
FIG. 1 shows a diagrammatic illustration of an exemplary valve arrangement having a pneumatic actuator which includes a position control system and an electronic evaluation unit for monitoring the operating state of the valve arrangement.

Exemplary embodiments of the present disclosure provide a method for diagnosing the operating state of a positioning control system for a valve arrangement having positioning control. The exemplary method described herein allows for reliable monitoring with simple technical means.

According to an exemplary embodiment of the method, a pressure sensor is used to measure the pressure in the drive chamber and/or in a pneumatic part directly operatively connected to the driver chamber. The measured pressure value is then analyzed in an evaluation unit with respect to the pressure p and the pressure change dp(t) over time in order to determine the flow of gas into/from the drive chamber and/or the ratio A/V of the drive chamber volume V to the effective opening cross section A of the pneumatic system (which can be determined by the opening cross section of the pilot valve arrangement) as a measure of the operating state. Irrespective of the drive chamber, the opening cross section A is the narrowest cross section through which air flows, that is to say the opening cross section in the pilot valve. It is therefore a measure of this pneumatic valve, and different opening cross sections A therefore indicate different states of this pneumatic valve as well as faults in the latter. In contrast, the drive chamber volume V describes the drive chamber, with the result that this can be a measure of the state of the drive chamber. The two variables, the opening cross section A and the drive chamber volume V, cannot be independently determined from the equation below.

An advantageous aspect of the above-described exemplary embodiment is, for example, that the operation of monitoring the operating state can be performed without additional information relating to the pneumatic system and without the measured values provided by a position sensor system in the pilot valve.

For a constant drive chamber volume V, the flow of gas dm/dt can be determined by an electronic evaluation unit included in the valve arrangement, starting from the pressure change dp(t), on the basis of the following formula:

$$dm/dt = A * psi(p1, p2) * p1 * sqrt(2/R/T).$$

A constant drive chamber volume V signifies a fixed position of the valve arrangement, that is to say the process valve does not move. This is advantageous for its use in a process controller. In this case, the intention is to carry out the diagnosis as far as possible without influencing the movement of the valve which is intended to move, as far as possible, according to the specifications of the desired value. Movements for the purpose of diagnosis can be carried out under particular conditions, if at all. However, this diagnosis here should be carried out without moving the process valve so that the equations are still valid.

In order to now ensure that the process valve does not move during the diagnosis, the diagnosis can be carried out when the valve is at one of its end stops, for example. In this state, the pressure in the drive chamber can be varied in a relatively wide range without the valve moving as long as a certain minimum pressure or maximum pressure is not exceeded/undershot. Alternatively, the diagnosis can be carried out when the process valve is fixedly in an approximately central position, for example. In this case, the pressure can also be varied in a narrow range within which the valve is still held by static friction. For example, the diagnosis can be carried out until the valve mechanism suddenly begins to move and the diagnosis is then ended immediately.

With a constant control pressure volume, the ratio of the drive chamber volume V to the effective opening cross section A of the pneumatic system can be determined, starting from the pressure change dp(t), on the basis of the following formula:

$$V/A = p1/(dp/dt) * psi(p1, p2) * gamma * sqrt(2*R*T)$$

where p1 indicates the pressure on the high-pressure side, p2 indicates the pressure on the low-pressure side, gamma represents the adiabatic exponent, R denotes the specific gas constant, and T denotes the temperature of the compressed air. Furthermore, dp(t) is the derivative of the pressure with respect to the time t. The parameter psi denotes the flow function which, for a subcritical flow (p2/p1 above a critical $p2/p1_{crit.}$), is a function of the two pressures and the adiabatic exponent and, for a supercritical flow (p2/p1 below the critical $p2/p1_{crit.}$), is virtually independent of the pressure, with a dependence only on the adiabatic exponent.

Therefore, the flow and the ratio (V/A) of the drive chamber volume to the effective opening cross section of the pneumatic system can be determined solely by means of the pressure, dependent only on the time and some gas parameters, for example.

The supercritical state is of interest, in particular, since the measurement can be carried out with only one pressure sensor, according to an exemplary embodiment. Whether or not the system is in a supercritical state can be determined from the characteristic of the pressure profile or by calculating the venting pressure or feed pressure on the basis of a roughly estimated pressure value. For example, the ratio V/A is of interest for determining the state of the valve system. This ratio already comprises all values which are relevant to the diagnosis. The flow is only an auxiliary value and can additionally be determined therefrom. This ratio can be used to determine both the volume of the drive chamber and the cross section of the valve slide in the pneumatic system if one of the values is known. In particular, the determination of the drive chamber volume is of interest during the process of initializing the positioning control system during start-up.

During initialization, the ratio V/A is measured by venting and/or ventilating the actuator with a fully opened valve element. When the opening cross section of the pneumatic system is known, the volume can be calculated using the relationship V/A. On the basis of the drive chamber volume, it is possible to determine whether a slowly reacting actuator with a huge volume or a very fast actuator with a small volume is present. This information can be used by the control algorithm to carry out appropriate adaptations.

On the other hand, the cross section of the valve element, that is to say the opening cross section of the pneumatic system, can be calculated from the relationship V/A using a known drive chamber volume, such as, for example, when the valve arrangement is in an end position which usually does not change over the service life of the valve when the valve position is the same. A change in the cross section of the valve element may be caused by deposits on the valve element or other faults in the pneumatic valve. A constant cross section of the valve element can be expected for a fixed electrical drive signal of the pilot valve arrangement. If a change in the cross section can be observed, it can be assumed that there are dimensional deviations or more serious errors within the scope of pilot control. A change in the ratio V/A for a constant electrical drive signal of the pilot valve arrangement can consequently be representative of a fault in the pneumatic valve.

If it can be assumed that the opening cross section A is known or has not changed, the value V/A can also be used to examine the position sensor for gross errors. If the value V/A is determined once in an end position of the valve arrangement and the opening cross section A is thus checked, the process valve can be moved to a central position in a next step and the value V/A can be determined again at this new position. With the previously checked opening cross section A, this value can be used to determine the drive chamber volume V and this is compared with the drive chamber volume V from an earlier comparison measurement. If these values differ from one another, it is determined that there is an error in the position measurement, according to an exemplary embodiment.

In order to ventilate and/or vent the drive chamber, the pilot valve arrangement which carries out pilot control on the valve arrangement can have an outer feed pressure connection for supplying pressure, a venting connection for removing the pressure escaping from the drive chamber, and may also comprise a digitally switching directional control valve which is in the form of a 3/2-way valve, for example. Alternatively, it is also conceivable to provide separate directional control valves for ventilation and venting which are then each in the form of a 2/2-way valve, for example. According to an exemplary embodiment, a pilot valve arrangement can be formed from an analog actuator which does not solely have binary functions but steplessly realizes an opening cross section starting from a closed position to a maximum open position. Such an actuator may be, for example, in the form of an electropneumatic proportional valve. Such analog pneumatic valves which can be controlled in a finer and more precise manner than they are generally used.

FIG. 1 illustrates an exemplary valve arrangement having a pneumatic actuator 10, according to at least one embodiment of the present disclosure. As illustrated in FIG. 1, a valve housing 2 of a process valve is fitted in a pipeline 1 (indicated in fragmentary form) of a process installation. The valve housing 2 has, in its interior, a closing body 4 which interacts with a valve seat 3 and is intended to control the amount of a process medium 5 passing through the valve housing 2. The closing body 4 is linearly actuated by the pneumatic actuator 10 via a lifting rod 7. The pneumatic actuator 10 is connected to the valve housing 2 of the process valve via a yoke 6. A digital position controller having a positioning control system 13 is fitted to the yoke 6. The lifting of the lifting rod 7 into the region of the position controller is detected and reported via a position sensor 12. The detected lifting is compared with a predefined desired value inside the positioning control system 13, and the pneumatic actuator 10 is driven on the basis of any determined control deviation. The pneumatic actuator 10 comprises a pilot valve arrangement (such as an electropneumatic UP converter, for example) for converting an electrical control signal representing the determined control deviation into an adequate control pressure. The control pressure is passed to a drive chamber 11 of the pneumatic actuator 10 via a pressure medium supply 14.

The pressure in the drive chamber 11 is measured in comparison with the atmospheric pressure via a pressure sensor 16 comprised in and/or communicatively attached to the pneumatic actuator 10. An an evaluation unit 15 analyzes the pressure value measured by the pressure sensor 16 with respect to the absolute pressure p and the pressure change dp(t) over time. The evaluation unit 15 uses this to determine the flow into/from the drive chamber 11 as well as the ratio of the drive chamber volume to the effective opening cross section of the pneumatic system as a measure of the operating state of the pneumatic actuator 10.

The position sensor 12, positioning control system 13, evaluation unit 15 and pressure sensor 16 were each described above with reference to the respective functions they perform according to an exemplary embodiment. It is to be understood that one or more these elements can be implemented in a hardware configuration. For example, the respective components can comprise a computer processor configured to execute computer-readable instructions (e.g., computer-readable software), a non-volatile computer-readable recording medium configured to store such computer-readable instructions, and a volatile computer-readable recording medium configured to be utilized by the computer processor as working memory while executing the computer-readable instructions. The position sensor 12, positioning control system 13, evaluation unit 15 and pressure sensor 16 may also be configured to sense, generate and/or operate in accordance with analog signals, digital signals and/or a combination of digital and analog signals to carry out their intended functions.

Figure 2:
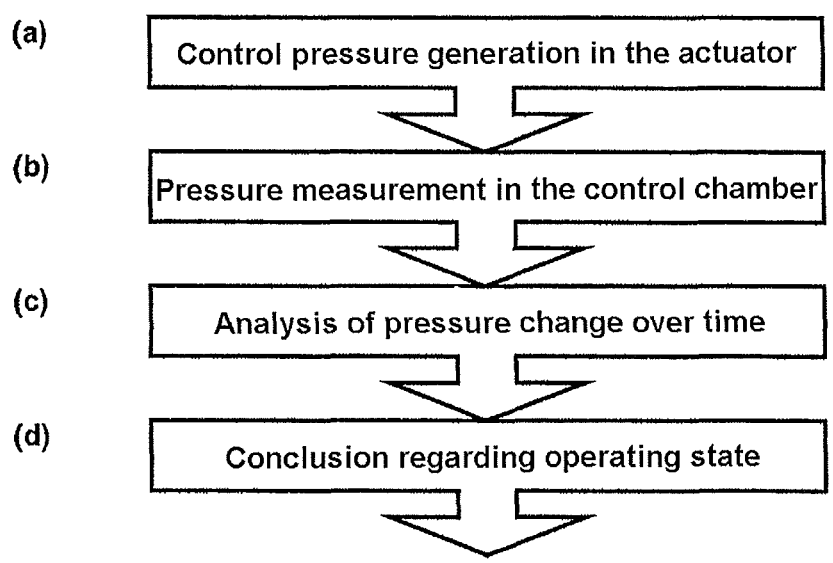
FIG. 2 shows a flowchart for illustrating an exemplary method for diagnosing the operating state. The exemplary method illustrated in FIG. 2 can be carried out by the exemplary electronic evaluation unit illustrated in FIG. 1.

FIG. 2 shows a flowchart for illustrating an exemplary method for diagnosing the operating state of a pneumatic value. The exemplary method illustrated in FIG. 2 can be carried out by the exemplary electronic evaluation unit illustrated in FIG. 1. The exemplary method for diagnosing the operating state of a pneumatic valve can include, in step a), the generation of control pressure by the pilot valve arrangement of the actuator in accordance with a positioning control system. For the pressure sensor mentioned, the pressure can be measured between a working connection and the drive chamber in step b). The evaluation unit then analyzes this measured pressure value with respect to the pressure value p and the pressure change dp(t) over time in step c). This makes it possible to draw a conclusion relating to the operating state in step d) by means of the determination of the ratio of the drive chamber volume to the effective opening cross section of the pneumatic system and/or the flow of gas into/from the drive chamber.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Valve housing
3 Valve seat
4 Valve element
5 Process medium
6 Yoke
7 Lifting rod
10 Actuator
11 Drive chamber
12 Position sensor
13 Positioning control system
14 Pressure medium supply
15 Evaluation unit
16 Pressure sensor

What is claimed is:

1. A method for diagnosing an operating state of a valve arrangement for controlling a flow of a process medium through a pipeline, wherein the valve arrangement includes a valve element accommodated in a valve housing and configured to switch the flow of the process medium in accordance with a positioning control system via a pneumatic actuator having a control piston, to at least one side of which control pressure is applied in a drive chamber, and an electronic evaluation unit connected to the positioning control system and configured to monitor the operating state of the valve arrangement, wherein the method comprises:

measuring in a pressure sensor, the pressure in at least one of the drive chamber and the pneumatic actuator operatively connected to the drive chamber;

analyzing the measured pressure in the evaluation unit with respect to a pressure p and a pressure change dp(t) over time to determine at least one of the flow into/from the drive chamber and a ratio of a volume of the drive chamber volume to an effective opening cross section of the valve arrangement as a measure of the operating state of the valve arrangement; and wherein, for a constant drive chamber volume, the flow is determined, starting from the pressure change dp(t), on the basis of a formal description of the flow.

2. The method as claimed in claim 1, wherein the measurement of the pressure is carried out while at least one of ventilating and venting the drive chamber.

3. The method as claimed in claim 1, wherein the formal description of the flow is determined by the following formula:

$$dm/dt = A * \text{psi}(p1, p2) * p1 * \text{sqrt}(2/R/T).$$

4. The method as claimed in claim 3, wherein dm/dt represents the flow of gas, p1 represents the pressure on a high-pressure side, p2 represents the pressure on a low-pressure side, R represents a specific gas constant, T represents a temperature of the gas in the valve arrangement, and psi represents a flow function.

5. The method as claimed in claim 1, wherein, for the constant drive chamber volume, the ratio of the drive chamber volume to the effective opening cross section of a pilot valve of the valve arrangement is determined, starting from the pressure change dp(t), on the basis of a formal description of the ratio of the volume of the drive chamber volume to the effective opening cross section of the valve arrangement.

6. The method as claimed in claim 5, wherein the formal description of the ratio of the drive chamber volume to the effective opening cross section of the pilot valve is determined by the following formula:

$$V/A = p1/(dp/dt) * \text{psi}(p1, p2) * \text{gamma} * \text{sqrt}(2 * R * T).$$

7. The method as claimed in claim 6, wherein V represents the volume of the drive chamber volume, A represents the effective opening cross section of the valve arrangement, p1 represents the pressure on a high-pressure side, p2 represents the pressure on a low-pressure side, gamma represents an adiabatic exponent, R represents a specific gas constant, T represents a temperature of air compressed in the valve arrangement, dp(t) is a derivative of the pressure with respect to the time t, and psi represents a flow function.

8. The method as claimed in claim 1, wherein a current position of the valve element is additionally determined via a position sensor, and a state of the position sensor is checked using a signal representative of the determined current position and the ratio V/A for a constant control pressure volume.

9. The method as claimed in claim 1, wherein the pressure p is an absolute pressure.

10. A valve arrangement for controlling a flow of process medium through a pipeline, comprising:

a valve housing configured to accommodate a valve element;

a position control system configured to control a control piston to control movement of the valve element;

a drive chamber configured to apply a pressure to at least one side of the control piston;

a pneumatic actuator configured to move the valve element accommodated in the valve housing and switch the flow of a process medium in accordance with the positioning control system;

an electronic evaluation unit connected to said positioning control system and configured to monitor an operating state of the valve arrangement;

a pressure sensor configured to measure the pressure in the drive chamber, wherein the electronic evaluation unit is configured to analyze the pressure measured by the pressure sensor with respect to a pressure p and a pressure change dp(t) over time and to determine at least one of the flow into/from the drive chamber and a ratio of the drive chamber volume to the effective opening cross section of the valve arrangement as a measure of the operating state of the valve arrangement; and wherein the pressure p is an absolute pressure.

11. The valve arrangement as claimed in claim 10, wherein the pneumatic actuator comprises at least one digital directional control valve configured to connect the control pressure side to at least one of a feed pressure connection and venting connection in accordance with a manipulated variable specified by the positioning control system.

12. The valve arrangement as claimed in claim 10, wherein the pneumatic actuator comprises at least one analog proportional valve configured to connect the control pressure side to at least one of a feed pressure connection and a venting connection in accordance with a manipulated variable specified by the positioning control system.

13. The valve arrangement as claimed in claim 10, wherein the position control system comprises a position sensor for detecting the position of the valve element.

* * * * *